W. C. DUNLAP.
CULTIVATOR ATTACHMENT.
APPLICATION FILED APR. 4, 1911.
1,025,458.
Patented May 7, 1912.
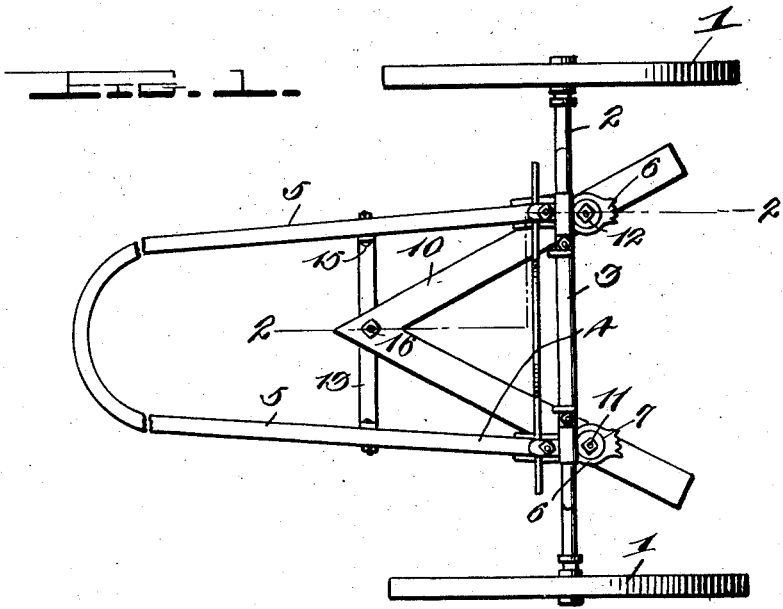
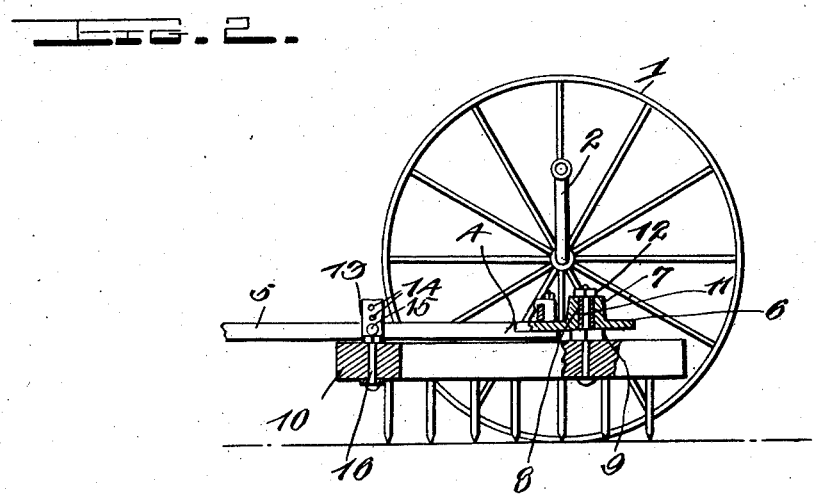
Witnesses
Chas. L. Griesbauer.
M. C. Tyddaue
Inventor
W. C. Dunlap,
By Watson E. Coleman.
Attorney
COLUMBIA PLANOGRAPH CO., WASHINGTON, D. C.

UNITED STATES PATENT OFFICE.

WILLIAM C. DUNLAP, OF EUPORA, MISSISSIPPI.

CULTIVATOR ATTACHMENT.

1,025,458. Specification of Letters Patent. Patented May 7, 1912.

Application filed April 4, 1911. Serial No. 618,876.

*To all whom it may concern:*

Be it known that I, WILLIAM C. DUNLAP, a citizen of the United States, residing at Eupora, in the county of Webster and State of Mississippi, have invented certain new and useful Improvements in Cultivator Attachments, of which the following is a specification, reference being had to the accompanying drawings.

My invention relates to new and useful improvements in agricultural implements and more particularly to attachments therefor and has reference to cultivators.

One object of my invention is to provide a harrow attachment for cultivators which can be easily and readily attached or detached therefrom and will necessitate but little if any change in the cultivator.

Another object is to provide an attachment of this character which will possess advantages in points of efficiency and durability, is inexpensive of manufacture and at the same time is simple in construction and operation.

With the foregoing and other objects in view the invention consists in the novel features of construction and arrangements of parts hereinafter described, pointed out in the claims and shown in the accompanying drawings in which—

Figure 1 is a top plan view showing the application of my improvement; Fig. 2 is a section of the harrow attachment taken on the line 2—2 of Fig. 1.

Referring more particularly to the drawings 1 indicates the wheels of the cultivator connected by the axle 2, and the frame 3 mounted thereon. The cultivator proper is mounted upon a U-shaped member 4 having two longitudinally disposed arms 5. Secured to the arms 5 are the clamping members 6, each provided with a sleeve 7 adapted to receive the studs 8, said studs being provided with an enlarged rectangular base 9 to fit tightly up against the sleeve and being securely fastened to the V-shaped harrow 10 by means of the bolts 11 running through the harrow frame and a nut 12 secured upon the upper end of the bolts.

The front end of the harrow is secured to the cultivator frame by means of the two diverging arms 13 having their upper ends provided with a plurality of bolt openings 14 so that the arms 13 can be secured to the member 4 at any desired height by means of the bolts 15. These arms are formed by a single strip of metal being bent upwardly and secured intermediate of its ends at the front end of the harrow by means of the bolt 16.

From the foregoing description taken in connection with the accompanying drawings the application and use of my improved attachment will be readily apparent. It will be seen from the description that the harrow can be readily adjusted so that the ground will be loosened to the required depth.

While I have shown and described the preferred form of my invention it will be obvious that various changes in the details of construction and in the proportion may be resorted to for successfully carrying the invention into practice without sacrificing any of the novel features or departing from the scope thereof.

Having thus described the invention what is claimed is:—

1. In a cultivator, the combination of a wheel supported frame including longitudinally disposed side bars, a V-shaped harrow frame arranged beneath said bars, sleeves on the ends of said bars, studs carried by the harrow frame and projecting through said sleeves, and bolts disposed through the harrow frame and through said studs and having nuts threaded on their upper ends to retain said bolts and the studs in said sleeves.

2. In a cultivator, the combination of a wheel supported frame including side bars, a V-shaped harrow arranged beneath said side bars and extending forwardly and rearwardly of the wheel axle, sleeves on the rear ends of said side bars, means carried by the harrow frame to be received in said sleeves to removably secure the harrow to said bars, and arms fixed to the front end of the harrow and adjustably secured to said side bars.

3. In a cultivator, the combination of a wheel supported frame, a V-shaped harrow arranged beneath said frame and extending forwardly and rearwardly of the wheel axle, sleeves carried by the frame, attaching means carried by the harrow frame to detachably secure the same to said sleeves, a transverse bar having its intermediate portion fixed to the front end of the harrow frame, the ends of said bar being vertically disposed and provided with a plurality of bolt receiving openings, and bolts to adjustably secure the ends of said bar to the frame.

In testimony whereof I hereunto affix my signature in the presence of two witnesses.

WILLIAM C. DUNLAP.

Witnesses:
J. EDGAR TAYLOR,
DELL M. MIDDLETON.

Copies of this patent may be obtained for five cents each, by addressing the "Commissioner of Patents, Washington, D. C."